UNITED STATES PATENT OFFICE.

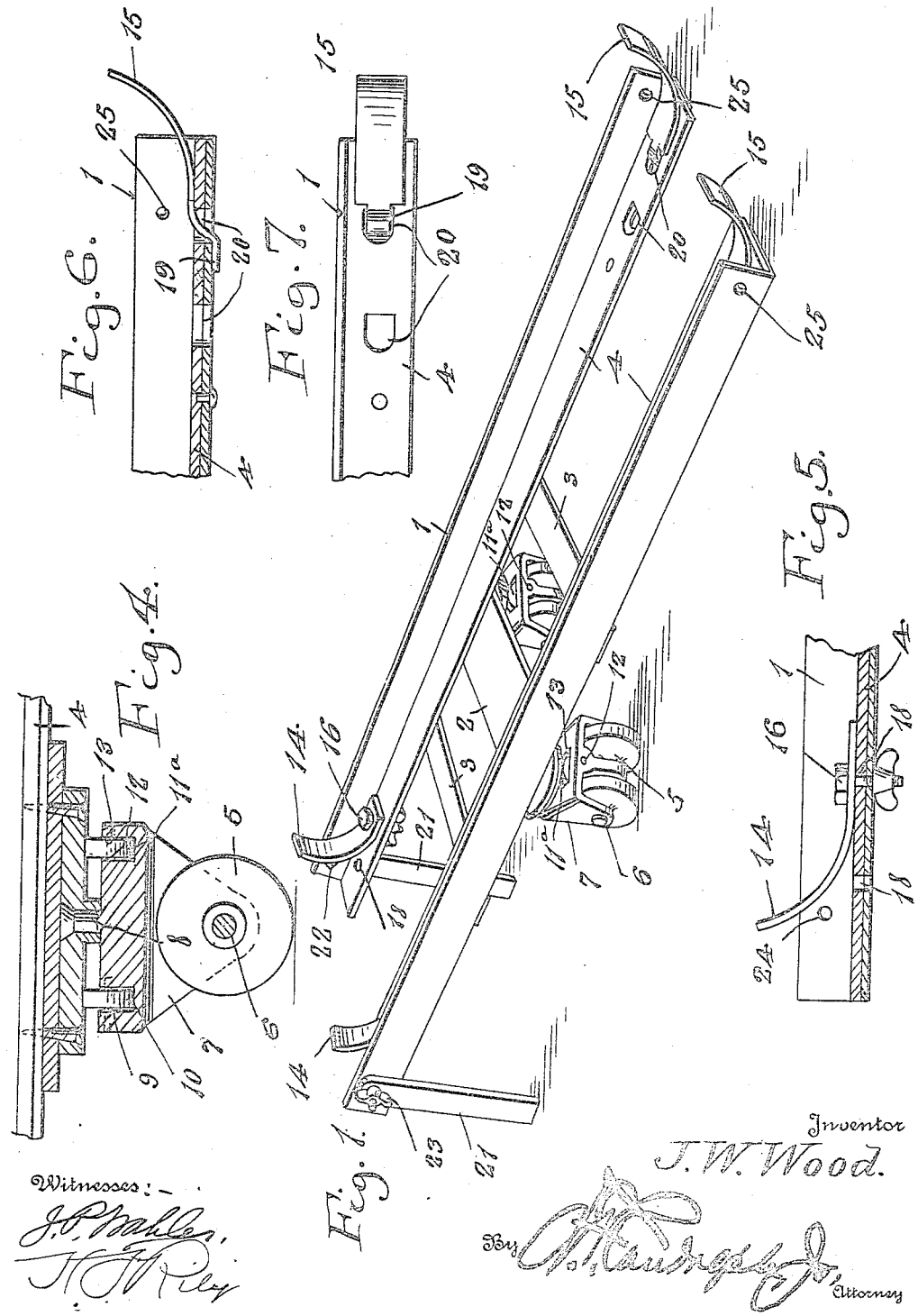

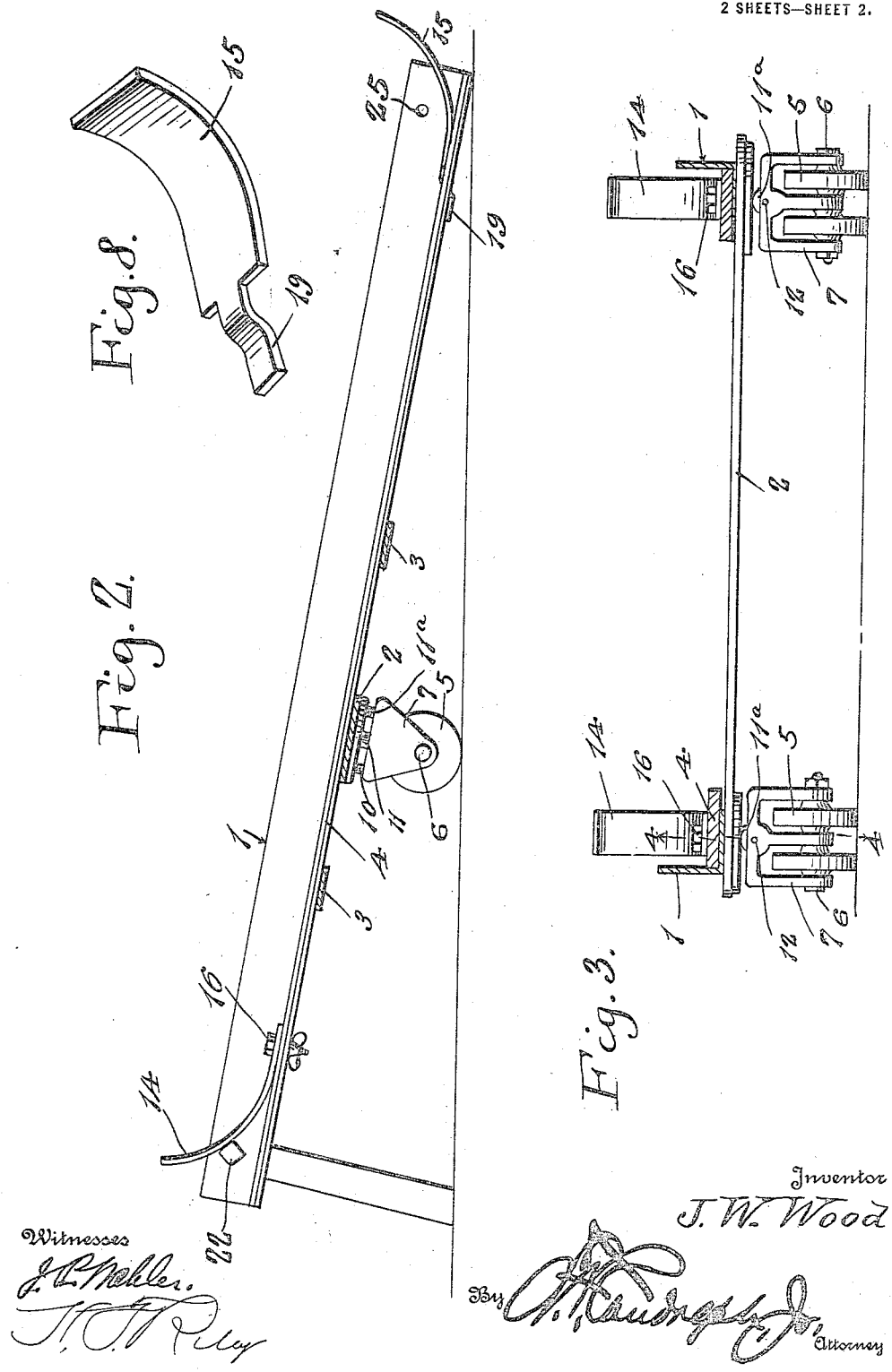

JOHN W. WOOD, OF SWARTZ CREEK, MICHIGAN.

AUTOMOBILE REPAIR-TRUCK AND TURN-TABLE.

1,243,574.                Specification of Letters Patent.         Patented Oct. 16, 1917.

Application filed April 21, 1917. Serial No. 163,663.

*To all whom it may concern:*

Be it known that I, JOHN W. WOOD, a citizen of the United States, residing at Swartz Creek, in the county of Genessee and State of Michigan, have invented certain new and useful Improvements in Automobile Repair-Trucks and Turn-Tables; and I do hereby declare the following to be a full, clear and exact description of the invention, such as will enable others skilled in the art to which it appertains to make and use the same.

The invention relates to an automobile repair truck and turn table.

The object of the present invention is to provide a simple, practical and efficient automobile repair truck and turn table of strong, durable and inexpensive construction adapted to enable an automobile to be readily run upon it and capable of easy operation to elevate either end of an automobile a sufficient distance above the surface upon which the truck is standing to enable repairs to be rapidly and conveniently made.

A further object of the invention is to provide an automobile repair truck and turn table of this character adapted to be readily handled by one man for moving an automobile sidewise or turning it in any direction or position required to make repairs in a garage or other place.

Another object of the invention is to provide an automobile repair truck and turn table which will be capable of adjustment to enable automobiles of different sizes to be accommodated without affecting the balancing of the machine on the device so that it may be readily handled by one man.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is a perspective view of an automobile repair truck and turn table constructed in accordance with this invention.

Fig. 2 is a longitudinal sectional view of the same.

Fig. 3 is a transverse sectional view of the repair truck and turn table.

Fig. 4 is a detail vertical sectional view on the line 4—4 of Fig. 3.

Fig. 5 is a longitudinal sectional view illustrating the construction of the adjustable resilient stops at one end of the device.

Fig. 6 is a similar view of the stop at the opposite end of the device.

Fig. 7 is a plan view of the adjustable stop shown in Fig. 6.

Fig. 8 is a detail perspective view of one of the adjustable stops.

Like numerals of reference designate corresponding parts in the several figures of the drawings.

In the accompanying drawings, in which is illustrated the preferred embodiment of the invention, the automobile repair truck and turn table comprises in its construction a supporting frame composed of spaced sides 1 preferably constructed of angle steel and connected by transverse plates or members 2 and 3 and suitably secured to the sides 1. The sides 1 are composed of inwardly extending supporting webs and vertical outer webs or walls, which are adapted to retain the automobile against lateral movement on the frame of the truck. The supporting webs or flanges of the angle side members 1 of the frame are provided with tread members 4 consisting of boards adapted to provide a wide track or tread surface for the wheels of an automobile for accommodating wheels of different sizes.

The frame of the truck is adapted to receive various sizes and kinds of automobiles and similar motor vehicles, and the transverse connecting plate or member 2 is designed to be located approximately one foot forward of the center of the frame to compensate for the weight of the front end of a car, the front end being heavier than the rear portion when the car is empty. The truck frame is supported by caster wheels 5 arranged in pairs and mounted on horizontal shafts or axles 6 which are journaled in suitable bearings of a bracket 7. The bracket 7 is composed of spaced sides and a central portion spaced from the sides to provide recesses to receive the wheels, the sides and the central portion being connected by an integral top portion. The bracket 7 is also provided with a central vertical pivot 8, which is arranged in a bearing 9 of a circular bearing plate or disk 10 having a depending portion or sleeve 11 spacing the disk or plate from the top of the bracket 7. The bracket 7 carries anti-friction wheels 11a preferably located at the front and back of the top portion of the bracket 7 and mounted on suitable shafts or axles 12. The bracket 7 is provided at the top with openings or recesses 13 to receive the anti-friction wheels which project above the upper face of the top of the bracket and receive and support the bearing plate or member 10. The bearing plate or member 10 is suitably secured to the transverse plate or member 2. By this construction the frame of the truck is mounted on wheels and is also pivotally mounted and adapted to be readily turned or rotated to perform the functions of a turn table so that a car may be arranged in any desired position in a garage or other place while repairs are being made.

The frame of the truck is provided with resilient adjustable end stops 14 and 15 preferably constructed of spring steel and curved to conform to the configuration of the wheels of an automobile. The curved stops 14, which extend upwardly and outwardly as shown, are preferably secured to the sides of the frame by bolts 16 having thumb nuts located at the lower faces of the sides of the frame. The sides of the frame are provided with a plurality of openings 18 to receive the bolts 16 to enable the stops 14 to be adjusted inwardly and outwardly.

In order to provide a quick detachment so that stops may be placed in the lower end of the sides of the truck frame, the stops 15 are provided with shanks 19 formed by reducing and angularly bending the inner end of the said stops 15. The shanks 19 are arranged in approximately segmental openings 20 of the bottom portions of the sides 1 of the truck frame, and the said stops are adapted to be rapidly placed in position after the machine has been run onto the truck frame and they are also readily removed to enable the machine to be run off of the truck frame. The openings 18 and 20 extend through the tread boards, and any number of such openings may of course be provided to obtain the requisite adjustment.

The truck frame is also equipped with legs 21 constructed of suitable metal and detachably secured at their upper ends to the sides of the truck frame by bolts 22 having nuts 23 and adapted to be arranged in openings 24 and 25 of the sides 1. The openings are formed in the upwardly extending flange or web of the angle members and the legs 21 are adapted to support either end of the truck frame in an elevated position. These legs are readily transferred from one end of the truck frame to the other and by tilting the truck frame either end of the car may be elevated a sufficient distance to enable repairs to be rapidly and conveniently made.

What is claimed is:

1. An automobile repair truck and turn table including a frame having supporting wheels and tiltable thereon, said frame being provided with openings located at opposite sides of the frame, and curved stops arranged to engage the wheels of an automobile and having shank portions arranged to extend through the said openings and engage the frame at the under side thereof whereby the stops are detachably secured in position.

2. An automobile repair truck and turn table including spaced angle sides having wheel supporting tread portions, swivel wheels located at opposite sides of the frame intermediate of the ends thereof and permitting the frame to be tilted and turned, curved stops carried by the frame at the ends thereof for engaging the wheels of a machine, said stops being adjustable, and the frame being provided at one end with means for effecting a quick attachment and removal of the stops.

3. An automobile repair truck and turn table including spaced angle sides having wheel supporting tread portions, swivel wheels located at opposite sides of the frame intermediate of the ends thereof and permitting the frame to be tilted and turned, curved stops carried by the frame at the ends thereof for engaging the wheels of a machine, said stops being adjustable and the frame being provided at one end with means for effecting a quick attachment and removal of the stops, and legs for supporting a machine in an elevated position, said legs and frame being provided with coacting means for enabling the legs to be attached to the frame at either end thereof.

In testimony whereof I affix my signature in presence of two witnesses.

JOHN W. WOOD.

Witnesses:
  ELBERN PARSONS,
  SETH B. TERRY.

Copies of this patent may be obtained for five cents each, by addressing the "Commissioner of Patents, Washington, D. C."